United States Patent [19]

Marik et al.

[11] 3,852,624

[45] Dec. 3, 1974

[54] PHASE SHIFTING NETWORK

[75] Inventors: Charles J. Marik, Chicago; Bernard Shlachter, Morton Grove; William H. Slavik, Palos Hills, all of Ill.

[73] Assignee: Motorola, Inc., Franklin Park, Ill.

[22] Filed: Sept. 7, 1973

[21] Appl. No.: 395,216

Related U.S. Application Data

[62] Division of Ser. No. 240,407, April 3, 1972.

[52] U.S. Cl. .................... 307/295, 307/262, 328/55

[51] Int. Cl. .................... H03k 5/00

[58] Field of Search ............ 307/262, 295; 328/167, 328/55

[56] References Cited

UNITED STATES PATENTS

| | | | |
|---|---|---|---|
| 3,038,089 | 6/1962 | Kittrell et al. | 307/295 X |
| 3,157,796 | 11/1964 | Coates | 307/295 X |
| 3,287,626 | 11/1966 | Sprague | 307/295 X |
| 3,287,664 | 11/1966 | Felix | 307/295 X |
| 3,525,943 | 8/1970 | Rinderle | 307/295 X |

*Primary Examiner*—John S. Heyman
*Attorney, Agent, or Firm*—Meuller, Aichele & Ptak

[57] ABSTRACT

Variable direct current control phase shifting networks are connected to supply reference signals with predetermined phases relative to the synchronizing signal. An I axis demodulator of a color television receiver is utilized to sense a component of color along the I axis and shift the phase of the reference signals to change the phase shift amount when a component is present on the I axis.

5 Claims, 1 Drawing Figure

PATENTED DEC 3 1974 3,852,624
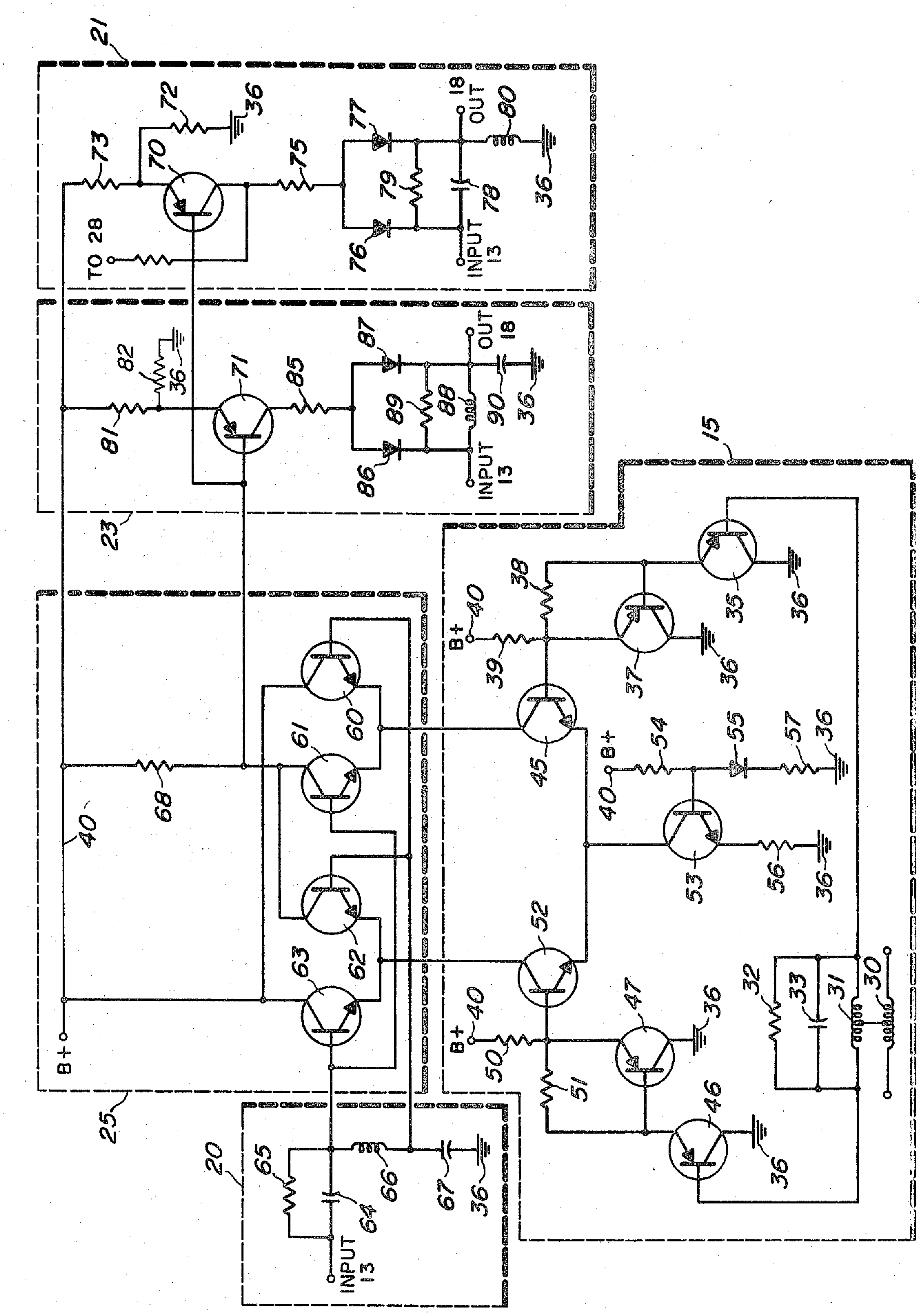

PHASE SHIFTING NETWORK

This is a division of application Ser. No. 240,407, filed 4-3-72.

BACKGROUND OF THE INVENTION

1. Field of the Invention

In color television transmitted according to NTSC standards, a synchronizing signal or burst and a chrominance signal are transmitted in a composite television signal. The phase of the chrominance signal relative to the synchronizing signal is critical, since it determines the hue or color ultimately produced in the receiver by the chrominance signal. Because of errors in transmission, caused by faulty equipment, improper adjustment, etc., the phase of the chrominance signal relative to the synchronizing signal will often be improper. These phase errors are most noticeable along the maximum acuity or I axis (reddish orange color) and least noticeable along the minimum acuity or Q axis (bluish red color).

2. Description of the Prior Art

In the prior art, attempts have been made to minimize the effects of transmitted phase errors between the synchronizing signal and the chrominance signal by bringing all colors which are close to the I axis closer or onto the I axis. This means that all colors which are even close to skin color will appear skin color when the correction is being utilized. Most receivers have switches for including the correction or excluding the correction as desired.

In a copending application entitled "Preset Control System For A Color Television Receiver," Ser. No. 140,489, filed May 5, 1971 and assigned to the same assignee, a hue correction system is described wherein the phase of the synchronizing signal applied to the red and blue color demodulators is altered to increase the angle between the red and blue color demodulators and, thereby, reduce the amplitude of the color components along the Q axis while increasing the amplitude of the color components along the I axis. While this system operates to provide better skin colors and adjacent colors, it has a tendency to reduce the greens.

SUMMARY OF THE INVENTION

The present invention pertains to apparatus and method for altering the phase of an input signal applied to a phase shift circuit relative to the input signal.

It is an object of the present invention to provide an improved phase shift circuit.

It is a further object of the present invention to provide a variable phase shift circuit.

These and other objects of this invention will become apparent to those skilled in the art upon consideration of the accompanying specification, claims and drawings.

BRIEF DESCRIPTION OF THE DRAWINGS

The sole FIGURE is a schematic diagram of a system incorporating an embodiment of the present invention.

DESCRIPTION OF THE PREFERRED EMBODIMENT

It is well known in the art that the chrominance signal portion of a composite color television signal can be represented by a rotating vector, the angle of which determines the hue or color and the magnitude of which determines the amount of the color. In this vector diagram it is relatively standard to represent the function (B-Y) as zero degrees, or extending along the abscissa, and the function (R-Y) as 90°, or extending along the ordinate. The synchronizing signal (burst or output signal from the oscillator 13) has a phase of 180°, or opposite the function (B-Y). The functions Q and I (the axis of least acuity and the axis of greatest acuity, respectively) are positioned at 33° and 123°, respectively. The colors red, green and blue lie at 103°, 241° and 347°, respectively.

In an uncompensated television receiver a zero phase angle reference signal is applied to the blue component demodulator to provide a chrominance component therefrom lying at zero degrees on the vector diagram. A 90° phase shifted reference signal is applied to the red component demodulator to provide a chrominance component lying at 90° and a 241° phase shifted reference signal is applied to the green component demodulator to provide a chrominance component at 241°. These angles result in a substantially circular demodulation curve, or a substantially equal demodulation of the chrominance signal regardless of the angle thereof.

When a component of the chrominance signal is present along the I axis, it is desirable to change the shape of the demodulation curve to emphasize I axis components. An elliptical demodulation curve about the I axis causes the skin colors to be accentuated and the greens and magentas to be greatly reduced. This has been found to be desirable in television receivers to minimize noticeable objectionable variations in skin colors.

In the drawing portions forming a differential amplifier and limiter 15, a fixed phase shifter 20, an I axis demodulator 25, a DC controlled phase shifter 21 and a DC controlled phase shifter 23 are each enclosed in dotted lines to clarify the circuitry thereof. It should be understood that other circuits might be utilized but the ones illustrated are chosen for simplicity and ease of manufacture.

A chrominance signal from the chroma processing portion of a television receiver (not shown) is applied across a tapped coil 30, the tap of which is connected to the tap of a second coil 31. A resistor 32 and a capacitor 33 are each connected in parallel with the coil 31. One end of the coil 31 is connected to the base of a PNP type transistor 35 the collector of which is grounded at 36 and the emitter of which is connected to the base of a second PNP type transistor 37. The emitter of the transistor 35 is also connected through a resistor 38 to the emitter of the transistor 37. The collector of the transistor 37 is grounded at 36. The emitter of the transistor 37 is also connected to a positive source of voltage 40 by a resistor 39. Further, the emitter of the transistor 37 is connected to the base of an NPN type transistor 45. The opposite side of the coil 31 is connected to the base of a PNP type transistor 46, the collector of which is connected to ground 36 and the emitter of which is connected to the base of a PNP type transistor 47. The collector of the transistor 47 is connected to ground 36 and the emitter is connected to the positive source of voltage 40 through a resistor 50, the base of the transistor 47 through a resistor 51, and the base of an NPN type transistor 52. The emitters of the transistors 45 and 52 are connected together and to the collector of an NPN type transistor 53, the emitter of which is connected to ground 36 through a resistor 56 and the base of which is connected to the positive source of voltage 40 through a resistor 54 and to the ground 36 through a series connected resistor 57 and forward biased diode 55.

The coils 30 and 31 and the associated circuitry form a bandpass filter circuit to allow only the desired signals to pass while the transistors 35, 37, 46 and 47 form a limiting circuit which operates only on a predetermined amplitude of voltage and thereafter is amplitude insensitive. The signals are supplied from the limiting circuit to the differential amplifier, transistors 45 and 52, with transistor 53 forming a current source in the emitter circuits. The collectors of the transistors 45 and 52 are the outputs for the differential amplifier and limiter 15.

The collector of the transistor 45 is connected to common emitters of a pair of NPN type transistors 60 and 61 and the collector of the transistor 52 is connected to common emitters of a pair of NPN type transistors 62 and 63. Transistors 60–63 and their associated circuitry form the I axis demodulator 25. The fixed phase shifter 20 includes a capacitor 64, one end of which is connected to a reference signal input, such as the output of a reference oscillator in a television receiver and the other end of which is connected to the common bases of transistors 61 and 63. A resistor 65 is connected in parallel with the capacitor 64. A series connected coil 66 and capacitor 67 are connected between the base of transistor 63 and the ground 36. The junction point of the coil 66 and capacitor 67 are connected to the base of transistor 60 and the base of transistor 62. The collectors of transistors 60 and 63 are connected directly to the positive source of voltage 40 and the collectors of the transistors 61 and 62 are connected to the positive source of voltage 40 through a resistor 68. The common collectors of the transistors 61 and 62 form the output of the I axis demodulator 25 and are connected to the base of a PNP type transistor 70 in the DC controlled phase shifter 21 and the base of a PNP type transistor 71 in the DC controlled phase shifter 23.

The emitter of the transistor 70 is connected to the junction between a pair of resistors 72 and 73, forming a voltage divider between the positive source of voltage 40 and ground 36. The collector of the transistor 70 is connected through a resistor 75 to the anodes of a pair of diodes 76 and 77. A capacitor 78 and resistor 79 are connected in parallel between the cathodes of the diodes 76 and 77 with the cathode of the diode 76 being connected to receive the synchronous reference signal on input terminal 13 and the cathode of the diode 77 being connected to supply the reference signal to the output terminal 18. A coil 80 connected between the cathode of the diode 77 and ground 36 completes the DC controlled phase shifter 21.

The emitter of the transistor 71 is connected to the junction of a pair of resistors 81 and 82, forming a voltage divider between the positive source of voltage 40 and ground 36. The collector of the transistor 71 is connected through a resistor 85 to the anodes of a pair of diodes 86 and 87. A parallel connected coil 88 and resistor 89 are connected between the cathodes of the diodes 86 and 87 with the cathode of the diode 86 connected to receive the reference signal on input terminal 13 and the cathode of the diode 87 connected to supply a reference signal to the output terminal 18. A capacitor 90 connected between the cathode of the diode 87 and ground 36 completes the DC controlled phase shifter 23.

In the operation of the circuitry illustrated in the drawing, whenever a signal within the desired band of frequencies and of sufficient magnitude appears across the coil 31 one of the transistors 35 or 46 is biased into conduction (depending upon the polarity of the voltage across the coil 31). The conducting transistor 35 or 46 turns on the associated transistor 37 or 47, respectively, whereupon the collector thereof approaches ground potential and the transistor 45 or 52, respectively, is biased into nonconduction. The combination of the reference signal applied to the bases of the transistors 60–63 from the phase shifter 20 and the chrominance signal applied to the emitters by way of the collectors of transistors 45 and 52 produce a DC signal at the common collectors of transistors 61 and 62 which signal is representative of the I axis component of the chrominance signal. When a component of the chrominance signal is present along the I axis the common collectors of transistors 61–62 drop to a lower voltage potential, which lower potential is applied to the common bases of transistors 70 and 71 to produce conduction therein. When transistor 70 conducts both diodes 76 and 77 are forward biased to provide a low resistance path to alternating current in parallel with the capacitor 78. This low resistance path in parallel with the capacitor 78 causes the synchronizing signal applied at the cathode of the diode 76 to be shifted in phase a lesser amount (from approximately 85° to approximately 115°). When transistor 71 conducts the diodes 86 and 87 are forward biased to provide a low resistance path in parallel with the coil 88 and alter the amount of phase shift of the synchronous signal applied at the cathode of the diode 86. With the diodes 86 and 87 forward biased the synchronous signal is shifted to approximately 345 degrees, as opposed to the 5 degree position of the reference signal when the diodes 86 and 87 are nonconducting.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A control circuit comprising:

a direct current voltage supply terminal;

an impedance connected between an input and an output for providing a first phase shift in a signal applied to the input;

a pair of oppositely poled diodes direct current connected in series circuit across said impedance;

control means connected between the junction of said pair of diodes and said direct current voltage supply terminal for selectively applying a forward biasing electrical energy across said diodes; and said diodes altering the value of said impedance upon being forward biased to provide a second phase shift in a signal applied to the input.

2. The combination according to claim 1 wherein said pair of oppositely poled diodes comprise the sole circuit components connected in series across said impedance.

3. The control circuit according to claim 1 wherein said control means for selectively applying a forward biasing electrical energy across said diodes comprises signal controlled circuit means.

4. The combination according to claim 3 wherein said signal controlled circuit means comprises a transistor, the collector-emitter path of which is connected in series circuit between the junction of said pair of diodes and said direct current voltage supply terminal, and the base of which is adapted for coupling with a control signal to vary the conductivity of said transistor.

5. A control circuit according to claim 4 further including means for applying a variable direct current bias potential to the base of said transistor.

* * * * *